United States Patent [19]

Eriksson et al.

[11] Patent Number: 6,000,552

[45] Date of Patent: Dec. 14, 1999

[54] PROCESS FOR PURIFICATION OF A FIBRE SUSPENSION

[75] Inventors: Thomas Eriksson, Stockholm; Börje Fredriksson, Sundsbruk; Tomas Wikström, Sundsvall, all of Sweden

[73] Assignee: Sunds Defibrator Industries AB, Sweden

[21] Appl. No.: 09/242,991

[22] PCT Filed: Aug. 25, 1997

[86] PCT No.: PCT/SE97/01401

§ 371 Date: May 6, 1999

§ 102(e) Date: May 6, 1999

[87] PCT Pub. No.: WO98/08610

PCT Pub. Date: Mar. 5, 1998

[30] Foreign Application Priority Data

Aug. 3, 1996 [SE] Sweden .................................. 9603165

[51] Int. Cl.⁶ ................................ B03D 1/24; D21C 5/02
[52] U.S. Cl. ................................ 209/164; 209/170; 162/4
[58] Field of Search ...................... 209/164, 170; 210/703, 221.2; 162/4

[56] References Cited

U.S. PATENT DOCUMENTS

| | | |
|---|---|---|
| 2,922,521 | 1/1960 | Schranz . |
| 3,012,669 | 12/1961 | Ziemer . |
| 3,012,670 | 12/1961 | Ziemer . |
| 3,012,671 | 12/1961 | Ziemer . |
| 3,012,672 | 12/1961 | Ziemer . |
| 4,448,681 | 5/1984 | Ludke . |
| 4,620,926 | 11/1986 | Linck . |
| 4,721,562 | 1/1988 | Barnscheidt . |
| 4,722,784 | 2/1988 | Barnscheidt . |
| 5,236,090 | 8/1993 | Britz . |
| 5,437,784 | 8/1995 | Meinecke et al. . |

FOREIGN PATENT DOCUMENTS

| | | |
|---|---|---|
| 325976 | 1/1989 | European Pat. Off. . |
| 31 11 506 C2 | 10/1982 | Germany . |
| 80/00423 | 3/1980 | WIPO . |

OTHER PUBLICATIONS

Jungmann et al "Investigations into Pneumatic Flotation of Various Raw Materials using the Allflot System"–Aufbereitungs–Technik pp. 470–477, Aug. 1988.

Primary Examiner—Thomas M. Lithgow
Attorney, Agent, or Firm—Lerner, David, Littenberg, Krumholz & Mentlik, LLP

[57] ABSTRACT

A process for the purification of a fiber suspension (deinking or white water) in which a mixture of fiber suspension and gas bubbles are jtted into a flotation tank in an upwardly directed manner toward the free surface of the pulp at a velocity of greater than 5m/s and the jet ends at or just below the free surface of the mixture.

6 Claims, No Drawings

PROCESS FOR PURIFICATION OF A FIBRE SUSPENSION

The present invention relates to a process for separating substances from a fiber suspension and more particularly to such a process wherein impurities, such as for example printing inks and other contaminating substances, are separated from the fibers in a flotation tank into which the fiber suspension in admixture with gas is introduced by means of directed jets having a high inlet velocity.

Flotation is a separation process which on an industrial scale primarily is utilized in mineral treatment and for purification of recycled fibers in order to separate undesirable components by treatment of a liquid based system of solid materials. Flotation processes can be carried out using methods wherein the essential separation force is either gravitation or centripetal acceleration. The flotation process is based on introduction of a gas, usually air, to which hydrophobic particles are attracted and subsequently can be separated in a foam phase. Different auxiliary chemicals are often used, especially surface active agents, for example in order to improve the hydrophobicity of the particles to be separated, to enhance foam formation etc.

In the pulp and paper field, treatment of recycled fiber by processes for removal of ink, often combined with bleaching, for production of recycled fiber pulp with a desired brightness, is a more and more growing area. The raw material, the recycled paper, is beaten with a high intensity while being dissolved to a consistency which usually is around about 15 percent by weight. Internal friction in the suspension due to high consistency causes strong shearing forces in the suspension which, when the fibers are rubbed against each other, results in release of ink and other impurities. In this preliminary step additions of certain chemicals can be made, for example addition of surface active chemicals for the subsequent flotation process and/or of bleaching chemicals such as hydrogen peroxide for later bleaching steps. After the initial slushing step there normally follows one or several screening steps in order to remove larger particles before the suspension is prepared for the actual removal of the printing ink. The suspension is hereby normally diluted to a consistency of about 1 percent by weight. Although addition of chemicals usually is made at the slushing, it is also possible to add auxiliary chemicals for the flotation at the dilution step. At the actual flotation the fiber suspension and air are introduced separately or in admixture into a flotation tank or cell and separation of the ink particles occurs as the particles adhere to the air bubbles and can be separated in the form of a foam. Subsequent treatment usually comprises certain additional separation steps and dewatering, dispersing, bleaching and dilution. The flotation treatment and optional subsequent steps are often repeated once or several times. To reduce fiber losses in the flotation the separated foam is usually treated in a secondary flotation step.

In contrast to flotation processes in the mineral industry there are special problems connected with achieving a good separation at flotation treatment of fiber suspensions, since the fibers form networks which obstruct the transport of the gas bubbles through the suspension. Due to this it has been necessary to work with very low fiber consistencies in the suspensions, which means that extremely large amounts of water have to be handled and this is, of course, a great disadvantage both with regard to economy and environment. Within the field of flotation of fiber suspensions an increase of the fiber concentration in the suspension which is small in terms of percentage thus involves an extremely substantial reduction of the total amount of water and a reduction of the flotation time is likewise an extremely important advantage.

One object of the present invention is to make treatment at increased fiber concentrations possible in purification of fiber suspensions, particularly in deinking of recycled fiber. The process of the invention makes this possible with short flotation times and good purification results and thus offers an improved process, both from an economical and environmental point of view.

The process according to the present invention is based on the insight of the importance of the rheological properties of the fiber suspension and particularly the breaking up of the fiber network and where the flow field in the tank exceed the yield stress, in order to make it possible to have an early release of the air bubbles and a facilitated transport of the aggregates of bubbles and particles through the medium.

The present invention thus relates to a process for separating undesired substances, in particular ink particles, from a fiber suspension, including use of flotation as further specified in the appended claims.

The fiber suspension which is separated according to the present invention is particularly a suspension of recycled fibers to be purified from printing ink and other impurities, such as so-called "stickiest". The flotation process is hereby as a rule a part of a total treatment procedure for recycled fibers of the principal type described in the introductory part of the specification. The flotation process can of course be applied to other suspensions of cellulose containing fibers, for example purification of white water containing fibers from paper machines. The principle type of flotation which is utilized in the present process is based on gravitation forces with separation of the substances to be removed in a foam phase and not based on separation with a substantial element of centrifugal forces, which is the case at separations in hydrocyclones. The purified fiber suspension which is obtained in the process is withdrawn as "accept" in a known manner.

Before the fiber suspension which is to be purified is introduced in the flotation tank or the flotation cell it has been mixed with gas bubbles. The gas used in this type of processes is as a rule always air, for economical and practical reasons, but it is of course principally possible to utilize any other gas. As some examples of gases which may be suitable can be mentioned carbon dioxide and residual oxygen gas, where the latter for example can be obtained from certain bleaching processes in the pulp industry. When the fiber suspension is introduced into the flotation tank it shall be well mixed with gas bubbles. This can be carried out in devices known for the purpose and several such intensive mixers are commercially available. The predominant part of adherence of colour particles and other impurities to the gas bubbles occurs already at the mixing and the bubbles should thus be relatively small in order to achieve a good efficiency in this respect. The admixed amount of gas is usually within the range of from 20 to 50 percent by volume, based on the suspension, and most often between about 30 and 40 percent. The actual attraction between the particles and the bubbles can be increased by the presence of surface active agents, eg ethoxylated nonyl phenols, fatty amines etc, which increase the hydrophobicity of the particles. Such auxiliary chemicals, as well as others, for example foaming agents and pH modifiers, can be added in the mixing step but in the treatment of recycled fiber they are suitably added in the slushing step.

The flotation process according to the present invention is characteristic in that the mixture of fiber suspension and gas bubbles is introduced in the flotation tank as directed streams having a high inlet velocity, so called "jets". The velocity is above 5 m/s and suitably above 8 m/s. The upper limit for the velocity is not critical but normally it would not be economical to have inlet velocities above 15–20 m/s. The fact that the jets have a high velocity and are directed means that they extend a substantial distance into the bulk volume of fiber suspension present in the flotation tank. A jet with an inlet velocity of 10 m/s will for example extend about 1 meter in the flotation tank. As will be discussed in more detail in the following, it is for example preferred that the jets do not end until close to the free surface of the suspension bulk volume when introduction is from the lower part of the flotation tank. The inlet openings in the flotation tank, ie the openings used for introduction of the jets, can be simple holes or inlet pipes, but it is more convenient to use nozzles in order to achieve the desired defined jets.

The injection can be made via one or preferably a plurality of inlet openings in a tank, which may have any geometric configuration, and for example be rectangular or cylindrical, which contains a defined bulk volume of fiber suspension and the obtained foam phase is withdrawn at the free surface of this bulk volume. The inlet openings can be located in the side walls of the tank at suitable distances below the free surface of the suspension and be directed downwards at an angle. It is, however, preferred that the openings are located at or close to the bottom of the tank and directed upwards, straight or at an angle, towards the free surface of the suspension. The velocity of the jets should be adjusted in such a manner that they end without breaking against any surfaces of the suspension and tank. In the preferred embodiment the velocity of each jet is thus adjusted in such a manner that the jets end at the free surface of the suspension without breaking this or just below said surface. This reduces the risk of back-mixing of the foam with the separated impurities into the purified suspension in the tank. The number of jets is of course dependent on the tank volume and the bulk volume of the suspension. At least three jets are suitably used and according to a preferred embodiment of the invention the number of jets and their velocities are adjusted to form shear surfaces which are as large as possible between the bodies of the jets and the bulk volume of suspension, without interaction between the jets and the boundaries of the bulk volume. As an example it can be mentioned that for a rectangular flotation tank having a length of 14 m, a breadth of 2 m and a height of 1 m, which is a common size at flotation for deinking of recycled fiber, 47 jets having inlet velocities of 9 m/s may be suitable at an approximate consistency of 1.5%.

Withdrawal of the foam phase is carried out at the free surface of the suspension in a manner known per se, for example by using an overflow. The purified fiber suspension (the accept) is likewise withdrawn in a manner known per se in this type of process, for example via outlets located at the bottom of the tank. The flotation is often, as customary, carried out with 4 to 6 repetitions to achieve the desired degree of purity.

The present invention is, as mentioned above, based on the understanding of the importance of the Theological properties of a fiber suspension. Breaking up the fiber network is here of particular importance to make it possible to have an early release of the air bubbles and a facilitated transport of the aggregates of bubbles and particles through the suspension. By considering the rheology in the present process, as described above, an efficient separation is obtained even at relatively concentrated fiber suspensions, where the concentration, which in conventional processes usually is close to 1 percent by weight, can exceed 1 percent. Very good results are obtained at fiber concentrations of 1.5 percent by weight and the concentration can be as high as 2 percent and even higher. A suitable concentration range is between 0.8 and 2.5% and preferably from 1.5 to 2%. The process thus offers substantial advantages as it makes it possible to have a most considerable reduction of the volumes of liquid handled and this with short treatment times and very good purification.

The theory which is utilized in this invention is "classical" fluid mechanics. For a bubble to rise upwards through the suspension its lifting power must exceed the viscous force from the suspension. The shear stress which must be exceeded is related to the apparent viscosity which arises when the suspension is flowing. The apparent viscosity of the suspension is directly related to the rheology of the suspension and the flow field which exists in the flow domain. The lifting power required for the bubble to rise in a flowing suspension is related to the state of stress in the surrounding suspension. To be able to optimize the shearing field in the suspension, ie to optimize the transport of bubbles, it is necessary to know the flow field and the rheology of the suspension. By reducing the length of the bubble transport and by controlling the shear field, by means of a correct flow field, a substantially improved bubble transport can be obtained.

The parameters given above for the velocity of the jets, the number of jets, their directions etc are based on the insight of the importance of a number of factors. Thus for example small bubbles give a greater efficiency in the attraction between the bubbles and the contaminating, hydrophobic particles which are to be removed. However, small bubbles usually do not have sufficient buoyancy to pass through the fiber network which exists in fiber suspensions. Since the small bubbles in the present process will be released over a larger area in the interface between the surface of each jet and the free suspension bulk volume, a certain coalescence of the bubbles will occur and this results in an increased lifting power. The fiber network itself is also subjected to a mechanical influence in the actual flotation process in the form of a velocity field. The flow field which then arise in the suspension facilitates the transport of the bubbles to the separation zone.

The invention is further illustrated in the following example, which, however, is not intended to limit the same.

EXAMPLE 1

A suspension of recycled fiber from newspapers and magazines having a concentration of 1.5% and containing flotation chemicals was mixed with 20% air in a static mixer and the mixture was injected into a rectangular flotation tank having a length of 3 m, a breadth of 2 m and a liquid height of 1.1 m. 10 injection nozzles were used with a total flow of 5000 l/min and an inlet velocity of 9 m/s. The jets were injected from the lower part of the tank, upwards at an angle towards the free liquid surface without breaking this. The jets were directed towards the intersecting line between the liquid surface and the rear limiting surface of the tank. The brightness for the incoming suspension was 41.5% ISO. The brightness increased to 50.5% ISO after one step.

It should here be mentioned that in order to achieve the same result with a conventional flotation process with an identical suspension the concentration must be lowered to 1.0% and, furthermore, the flotation must be carried out in two steps.

As evident the process according to the invention gave a very good deinking and this at a high fiber concentration in comparison with conventional plants. It can also be mentioned that at a normal production of recycled fiber pulp of 500 ton/day an increase of the concentration in the flotation step from 1 percent by weight to 1.5 percent by weight involves a reduction of the amount of water of from 50000 m$^3$ to 33300 m$^3$ per day.

We claim:

1. A process for separating undesired substances from a fiber suspension by the use of a flotation tank having a bottom and including at least three inlet nozzles adjacent to said bottom, comprising:

mixing said fiber suspension with gas bubbles to form a mixture of said gas bubbles and said fiber suspension, filling said flotation tank with a predetermined volume of said mixture to form a free surface of said mixture in said flotation tank, supplying the remaining volume of said mixture into said flotation tank through said inlet nozzles in the form of jets of said mixture having inlet velocities greater than about 5 m/s, so that said gas bubbles carry said undesired substances up to said free surface and form a foam containing separated substances on said free surface, directing said inlet nozzles so that said jets are directed upwards toward said free surface of said mixture in said tank, adjusting said inlet velocities of said jets so that said jets end at or just below said free surface of said mixture in said tank, removing said formed foam from said tank, and removing purified fiber suspension from said tank.

2. A process according to claim 1, wherein said inlet velocities of said jets are greater than about 8 m/s.

3. A process according to claim 1, wherein the number of said inlet nozzles are selected and the velocities of said jets of said mixture are adjusted to maximize the shearing area of said jets.

4. A process according to claim 1, wherein said fiber suspension has a fiber concentration of from about 0.8 to 2.5 percent by weight.

5. A process according to claim 4, wherein said fiber suspension has a fiber concentration of from about 1.5 to 2 percent by weight.

6. A process according to claim 1, wherein said fiber suspension comprises a suspension of recycled fiber containing said undesired substances including ink.

\* \* \* \* \*

UNITED STATES PATENT AND TRADEMARK OFFICE
CERTIFICATE OF CORRECTION

PATENT NO. : 6,000,552
DATED : December 14, 1999
INVENTOR(S) : Eriksson et al.

It is certified that error appears in the above-identified patent and that said Letters Patent is hereby corrected as shown below:

[57] ABSTRACT, line 5, "Sm/s" should read --5m/s--.
Column 2, line 24, "stickiest" should read --"stickies"--.

Signed and Sealed this

Twelfth Day of September, 2000

*Attest:*

Q. TODD DICKINSON

*Attesting Officer*   *Director of Patents and Trademarks*